United States Patent
Betts et al.

(10) Patent No.: US 9,286,137 B2
(45) Date of Patent: Mar. 15, 2016

(54) ACHIEVING DETERMINISTIC EXECUTION OF TIME CRITICAL CODE SECTIONS IN MULTI-CORE SYSTEMS

(75) Inventors: Ian Betts, Newmarket on Fergus (IE); Alexander Komarov, Feldkirchen (DE); Anton Langebner, Salzburg (AT)

(73) Assignee: Intel Corporation, Santa Clara, CA (US)

( * ) Notice: Subject to any disclaimer, the term of this patent is extended or adjusted under 35 U.S.C. 154(b) by 680 days.

(21) Appl. No.: 13/618,172

(22) Filed: Sep. 14, 2012

(65) Prior Publication Data

US 2014/0082243 A1    Mar. 20, 2014

(51) Int. Cl.
  *G06F 13/32*    (2006.01)
  *G06F 9/52*     (2006.01)
  *G06F 9/30*     (2006.01)

(52) U.S. Cl.
  CPC ............ *G06F 9/526* (2013.01); *G06F 9/30087* (2013.01)

(58) Field of Classification Search
  CPC ........ G06F 13/32; G06F 9/526; G06F 9/3008
  See application file for complete search history.

(56) References Cited

U.S. PATENT DOCUMENTS

| | | | | |
|---|---|---|---|---|
| 6,968,447 | B1* | 11/2005 | Apisdorf et al. | 712/235 |
| 6,978,459 | B1* | 12/2005 | Dennis et al. | 718/100 |
| 2008/0320231 | A1* | 12/2008 | Kinter et al. | 711/141 |
| 2011/0072180 | A1* | 3/2011 | Lee | 710/260 |
| 2011/0154343 | A1* | 6/2011 | Michael et al. | 718/102 |
| 2012/0233407 | A1* | 9/2012 | Choi et al. | 711/122 |
| 2014/0075163 | A1* | 3/2014 | Loewenstein et al. | 712/225 |

* cited by examiner

*Primary Examiner* — Nimesh G Patel
(74) *Attorney, Agent, or Firm* — Jordan IP Law, LLC

(57) ABSTRACT

Systems and methods may provide for detecting a time critical code section associated with a real time processor core and suspending execution on a suspendable processor core in response to the time critical code section. Additionally, execution on the suspendable core may be resumed when the real time processor core reaches the end of the time critical code section. In one example, execution is suspended by issuing an inter-processor interrupt (IPI) from the real time core to the suspendable core, wherein execution may be resumed when the real time core conducts a write to a memory location that is monitored by the suspendable core during suspension of execution.

28 Claims, 4 Drawing Sheets

ACHIEVING DETERMINISTIC EXECUTION OF TIME CRITICAL CODE SECTIONS IN MULTI-CORE SYSTEMS

BACKGROUND

Embodiments generally relate to the execution of time critical code sections. More particularly, embodiments relate to architectures that achieve deterministic execution of time critical code sections in multi-core systems.

Modern computing systems may include CPU (central processing unit) architectures that have multiple processor cores capable of running different threads. Indeed, each core in a multi-core processor may potentially run threads from a different operating system (OS), depending upon the circumstances. Certain types of operating systems, however, may have tighter code execution deadlines than others, which can present implementation challenges when the cores compete for shared resources. For example, a real time OS (RTOS) might be required to respond and complete tasks before relatively tight (e.g., "hard") deadlines, whereas a general purpose OS (GPOS) may permit more unpredictability and variation in execution times. Accordingly, engineering a multi-core processor to run both an RTOS and a GPOS may only be possible under conventional approaches if real time code execution deadlines are relatively loose (e.g., measured in milliseconds). Many industrial real time tasks, however, can have deadlines that are substantially tighter (e.g., measured in tens or hundreds of microseconds).

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
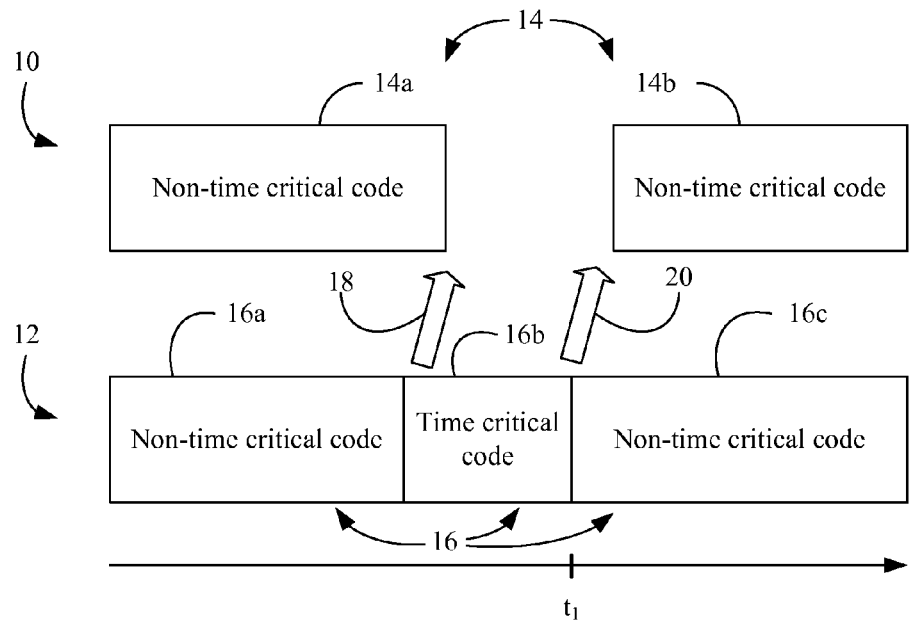
FIG. 1 is a block diagram of a time critical code section in a multi-core processing environment according to an embodiment.

Turning now to FIG. 1, a multi-core processor architecture is shown in which a first (e.g., suspendable) processor core 10 and a second (e.g., real time) processor core 12 share one or more resources such as a last level cache (LLC), an input output (IO) controller, a memory controller, and so forth (not shown). In the illustrated example, the suspendable processor core 10 executes non-time critical code 14 (14a, 14b), and a real time processor core 12 executes code 16 (16a-16c) that has non-time critical sections 16a, 16c as well as a time critical section 16b. More particularly, the time critical section 16b may have a hard deadline at time $t_1$, wherein if the suspendable processor core 10 continues to execute code while the real time processor core 12 executes the time critical section 16b, the real time processor core 12 may not have sufficient access to shared resources in order to meet the deadline at time $t_1$.

Accordingly, the illustrated real time processor core 12 issues a first signal 18 to the suspendable processor core 10 when the real time processor core 12 begins executing the time critical section 16b, wherein the first signal 18 causes the suspendable processor core 10 to conduct an internal suspension of execution (e.g., suspend itself by entering a sleep and/or halt state). As a result, the real time processor core 12 may not be forced to compete with the suspendable processor core 10 over shared resources and can become more deterministic with regard to the execution of the time critical section 16b.

In one example, the first signal 18 is an inter-processor interrupt (IPI), wherein the suspendable processor core 10 may run a driver having an IPI handler configured to detect the IPI and suspend execution on the suspendable processor core 10 in response to the IPI. The suspension of execution by the core 10 may involve blocking an OS from using the suspendable processor core 10 to execute code such as, for example, GPOS code (e.g., Windows 8, Linux). In this regard, the GPOS code may be more tolerant of execution time variability than the time critical section 16b executing on the real time processor core 12. Indeed, the time critical section 16b may be part of an RTOS (e.g., VxWorks, INTEGRITY) that has tight execution deadlines (e.g., measured in tens of microseconds), whereas the non-time critical code 14 might have more lenient execution deadlines. Alternatively, the non-time critical code 14 that executes on the suspendable processor core 10 may also be part of an RTOS, wherein the time critical section 16b may be deemed to be more critical than the illustrated non-time critical code 14.

If the suspendable processor core 10 is capable of receiving other non-IPIs (e.g., system management interrupts, timer interrupts, etc.) associated with other threads and/or tasks, it may be determined and/or verified that those non-IPIs have been disabled or otherwise configured to prevent the other threads/tasks from being scheduled on the suspendable processor core 10 during the suspension of execution. Disabling the non-IPIs may involve, for example, profiling the system to identify the sources of the non-IPIs, and eliminating them at the source, wherein the profiling/elimination processes may be conducted offline (e.g., during manufacturing and/or fabrication stages, upgrade stages, etc.).

The illustrated real time processor core 12 also issues a second signal 20 to the suspendable processor core 10 upon reaching the end of the time critical section 16b. Accordingly, the suspendable processor core 10 may conduct a resumption of execution of the non-time critical code 14b in response to the second signal 20. As will be discussed in greater detail, the second signal 20 may take the form of a write operation to a specific memory location that is monitored by the suspendable processor core 10 during the suspension of execution. In this regard, the suspendable processor core 10 may run a driver that is also configured to monitor the memory location during the suspension of execution (although all other operations may be halted).

Figure 2:
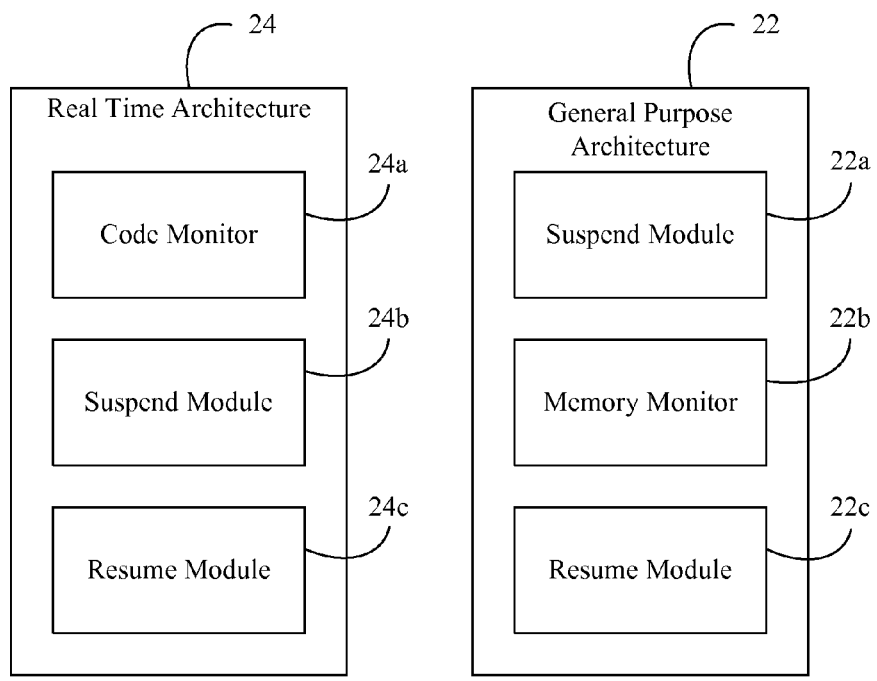
FIG. 2 is a block diagram of a logic architecture according to an embodiment.

FIG. 2 shows a logic architecture having a general purpose architecture 22 (22a-22c) and a real time architecture 24 (24a-24c). The logic architecture may be generally incorporated into a mobile platform such as an industrial control system, laptop computer, personal digital assistant (PDA), wireless smart phone, media player, imaging device, mobile Internet device (MID), any smart device such as a smart phone, smart tablet and so forth, or any combination thereof. The logic architecture may also be part of a fixed platform such as a personal computer (PC), smart TV, server, workstation, etc. In the illustrated example, the real time architecture 24 includes a code monitor 24a to detect time critical code sections associated with a real time processor core, wherein a suspend module 24b may issue signals to the general purpose architecture 22 in response to the time critical code sections. As already noted, the signals may be IPIs. The general purpose architecture 22 may include a suspend module 22a that conducts suspensions of execution with respect to a suspendable processor core in response to the signals from the suspend module 24b of the real time architecture 24.

The illustrated real time architecture 24 also includes a resume module 24c to conduct writes to a semaphore (e.g., controlled access) memory location associated with suspendable processor core in response to the real time processor core reaching the end of the time critical code sections, wherein the general purpose architecture 22 may include a memory monitor 22b to detect the writes. In this regard, MONITOR/MWAIT instructions may be used, for example, to monitor the memory location, wherein the MONITOR instruction can define an address range used to monitor semaphore stores and the MWAIT instruction can be used to indicate that the software thread on the suspendable processor core is waiting for a semaphore store to the address range defined by the MONITOR instruction. Thus, if the illustrated memory monitor 22b detects a write by the real time processor core to the memory location, a resume module 22c may conduct a resumption of execution with respect to the suspendable processor core in response to the write.

Figure 3:
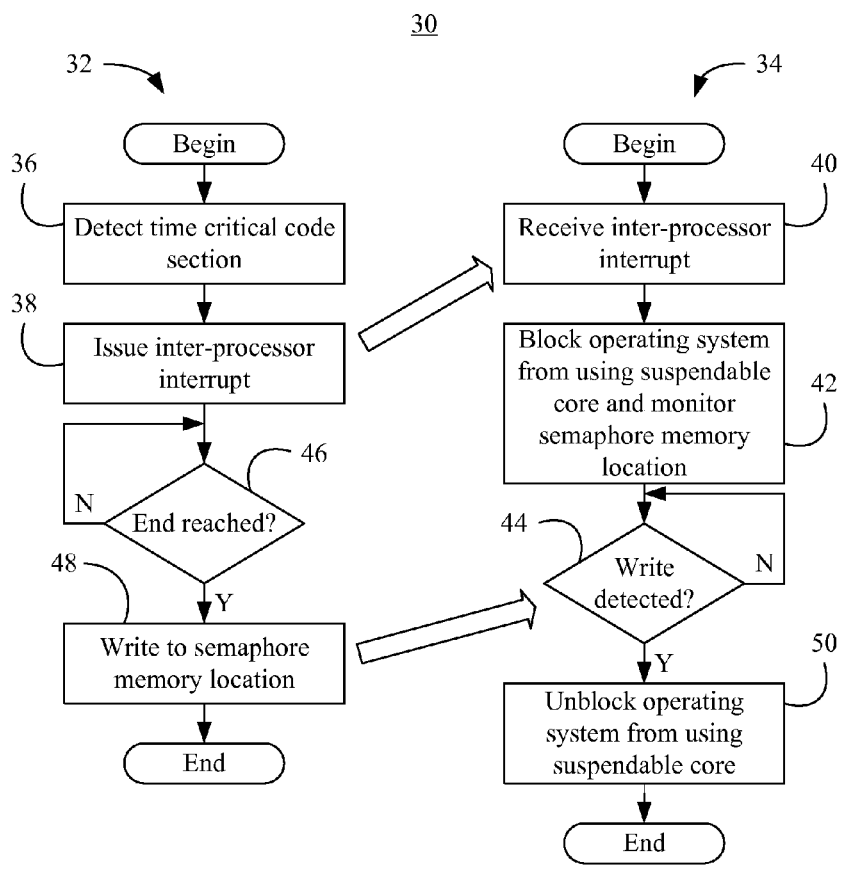
FIG. 3 is a flowchart of an example of a method of operating a multi-core processing environment according to an embodiment.

Turning now to FIG. 3, a method 30 of operating a multi-core processing environment is shown. The method 30 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 30 may be written in any combination of one or more programming languages, including an object oriented programming language such as C++ or the like and conventional procedural programming languages, such as the "C" programming language or similar programming languages. Moreover, the method 30 could be implemented using any of the aforementioned circuit technologies.

In general, the method 30 may include a real time portion 32 and a general purpose portion 34, wherein illustrated real time processing block 36 provides for detecting a time critical code section associated with a real time processor core. As already noted, the time critical code section may be detected in an RTOS. Additionally, an IPI can be issued at real time processing block 38 in response to the time critical code section, wherein illustrated general purpose block 40 receives the IPI. An OS such as a GPOS may be blocked (e.g., prevented) at general purpose block 42 from using a suspendable core in response to the IPI, while illustrated real time processing block 46 determines whether the real time processor core has reached the end of the time critical code section. If so, a write to a semaphore memory location may be conducted at real time processing block 48, wherein illustrated general purpose block 44 determines whether the write to the semaphore memory location by the real time processor core has occurred. If so, the OS may be unblocked from using the suspendable core at general purpose block 50.

Figure 4:
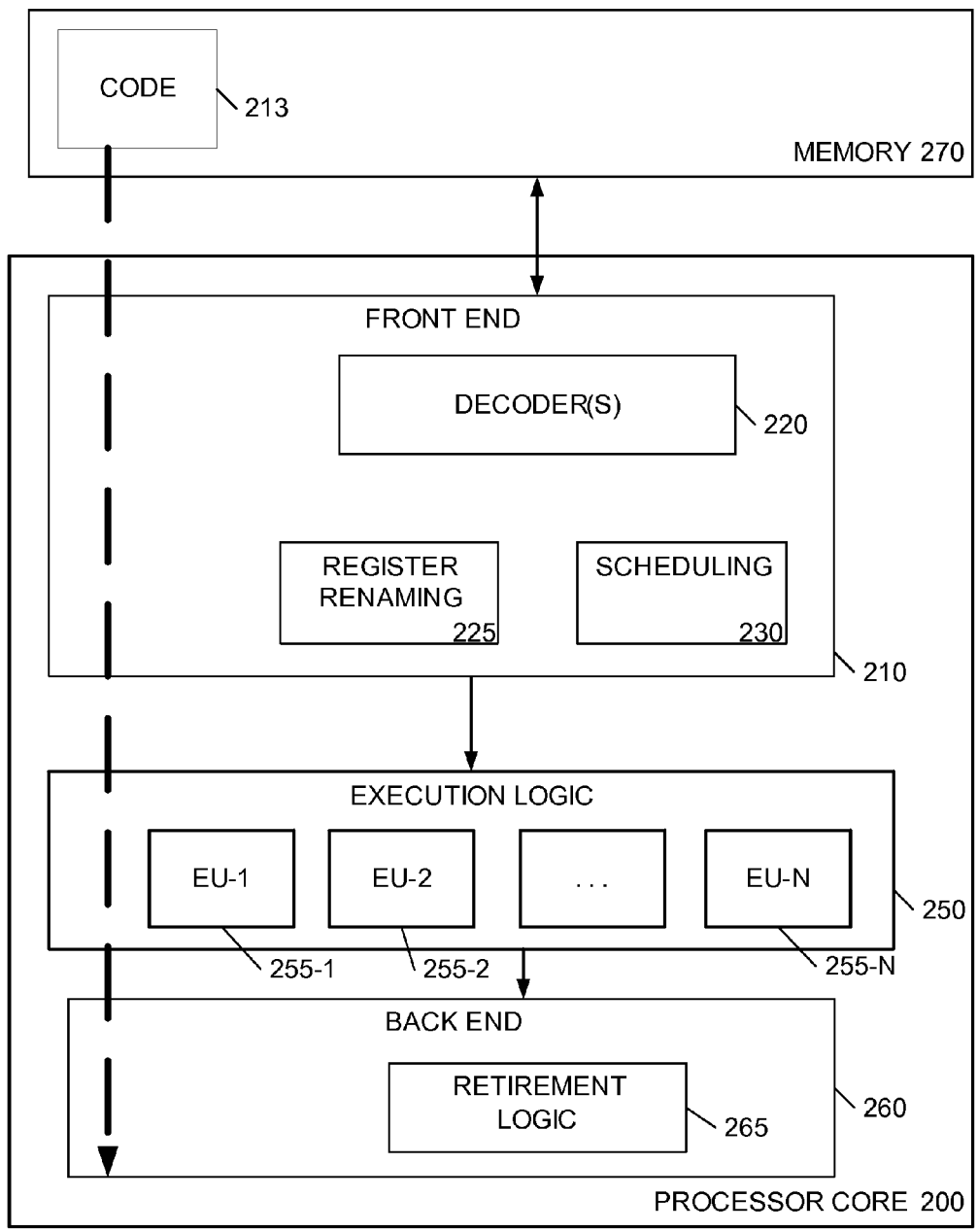
FIG. 4 is a block diagram of an example of a processor according to an embodiment.

FIG. 4 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the general purpose architecture 22 (FIG. 2) and/or the real time architecture 24 (FIG. 2), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 5:
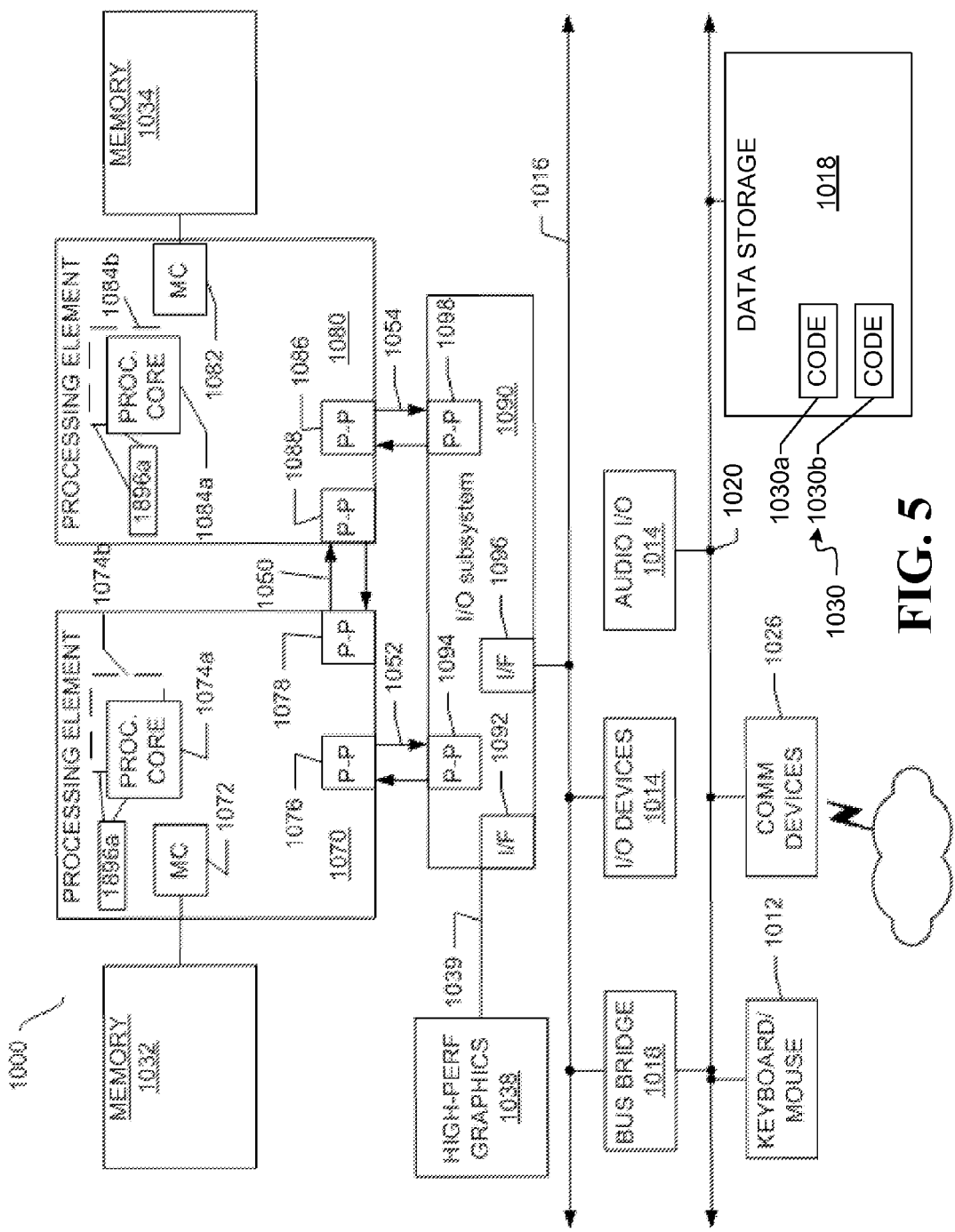
FIG. 5 is a block diagram of an example of a system according to an embodiment.

Referring now to FIG. 5, shown is a block diagram of a system 1000 in accordance with an embodiment of the present invention. Shown in FIG. 5 is a multiprocessor system 1000 that includes a first processing element 1070 and a second processing element 1080, wherein one or more non-IPIs (e.g., system management interrupts, timer interrupts, etc.) may be disabled. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 4. For example, processor core 1074a might execute an RTOS having one or more time critical code sections, whereas processor core 1074b may execute a GPOS having only non-time critical code. Similarly, processor core 1084a might execute an RTOS having one or more time critical code sections, whereas processor core 1084b may execute a GPOS having only non-time critical code.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, the second processing element 1080 may include an MC 1082 and P-P interfaces 1086 and 1088. As shown in FIG. 5, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 5, various I/O devices 1014 may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1018 such as a disk drive or other mass storage device which may include code 1030 (1030a, 1030b), in one embodiment. The code 1030 may generally include instructions for performing embodiments of one or more of the methods described above. Thus, the illustrated code 1030a may implement the general purpose architecture 22 (FIG. 2) and the illustrated code 1030b may implement the real time architecture 24 (FIG. 2), wherein the code 1030 could be similar to the code 213 (FIG. 4), already discussed. Further, an audio I/O 1014 may be coupled to the second bus 1020.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

Examples may include at least one computer-readable medium having one or more instructions that when executed on a real time processor core configure the real time processor core to detect a time critical code section associated with the real time processor core. The instructions, when executed, may also cause the real time processor core to initiate a suspension of execution with respect to a suspendable processor core in response to the time critical code section, and initiate a resumption of execution with respect to the suspendable processor core in response to the real time processor core reaching an end of the time critical code section. The real time processor core may share a resource with the suspendable processor core.

Additionally, the real time processor core instructions, when executed, may configure the real time processor core to issue an inter-processor interrupt (IPI) to the suspendable processor core to initiate the suspension of execution.

Additionally, the real time processor core instructions, when executed, may configure the real time processor core to determine that one or more non-IPIs of a system having the suspendable processor core have been disabled.

Moreover, the real time processor core instructions, when executed, may configure the real time processor core to write to a semaphore memory location of the suspendable processor core to initiate the resumption of execution.

In addition, the real time processor core instructions, when executed, configure the real time processor core to detect the time critical code section in a real time operating system associated with the real time processor core.

In addition, the real time processor core and the suspendable processor core of any of the aforementioned real time processor medium examples may share one or more of a last level cache, an input output (IO) controller and a memory controller.

Examples may also include at least one computer-readable medium having one or more instructions that when executed on a suspendable processor core configure the suspendable processor core to conduct a suspension of execution with respect to the suspendable processor core in response to a signal from a real time processor core. The instructions, when executed, may also cause the suspendable processor core to detect a write by the real time processor core to a semaphore memory location of the suspendable processor core. Moreover, the instructions, when executed, may cause the suspendable processor core to conduct a resumption of execution with respect to the suspendable processor core in response to the write by the real time processor core to the memory location, wherein the suspendable processor core may share a resource with the real time processor core.

Additionally, the signal from the real time processor core in the suspendable processor core medium example may include an inter-processor interrupt (IPI).

Additionally, the suspendable processor core instructions, when executed, may configure the suspendable processor core to determine that one or more non-IPIs of a system having the suspendable processor core have been disabled.

Moreover, the suspendable processor core instructions, when executed, may configure the suspendable processor core to block a general purpose operating system from using the suspendable processor core during the suspension of execution.

In addition, the real time processor core and the suspendable processor core of any one of the aforementioned suspendable processor core medium examples may share one or more of a last level cache, an input output (IO) controller and a memory controller.

Examples may also include a code execution method in which a time critical code section associated with a real time processor core is detected. The method may also provide for initiating a suspension of execution with respect to a suspendable processor core in response to the time critical code section. Additionally, a resumption of execution may be initiated with respect to the suspendable processor core in response to the real time processor core reaching an end of the time critical code section, wherein the real time processor shares a resource with the suspendable processor core.

Additionally, initiating the suspension of execution may include issuing an inter-processor interrupt (IPI) from the real time processor core to the suspendable processor core.

Additionally, the method may further include determining that one or more non-IPIs of a system having the suspendable processor core have been disabled.

Moreover, initiating the resumption of execution may include writing to a semaphore memory location of the suspendable processor core.

In addition, the time critical code section may be detected in a real time operating system.

In addition, the method may further include conducting the suspension of execution with respect to the suspendable processor core in response to a signal from the real time processor core, detecting a write by the real time processor core to a semaphore memory location of the suspendable processor core, and conducting the resumption of execution with respect to the suspendable processor core in response to the write by the real time processor core to the memory location.

Moreover, the signal from the real time processor core may include an inter-processor interrupt.

Additionally, conducting the suspension of execution may include blocking a general purpose operating system from using the suspendable processor core during the suspension of execution.

Additionally, the real time processor core and the suspendable processor core in any one of the aforementioned method examples may share one or more of a last level cache, an input output (IO) controller and a memory controller.

Examples may also include a code execution system having a shared resource, a suspendable processor core coupled to the shared resource, and a real time processor core coupled to the shared resource. The suspendable processor core may include a first suspend module to conduct a suspension of execution with respect to the suspendable processor core in response to a signal, and a memory monitor to detect a write to a semaphore memory location of the suspendable processor core. The suspendable processor core may also include a first resume module to conduct a resumption of execution with respect to the suspendable processor core in response to the write. The real time processor core can include a code monitor to detect a time critical code section associated with the real time processor core, and a second suspend module to issue the signal to the suspendable processor core in response to the time critical code section. The real time processor core may also include a second resume module to conduct the write to the memory location associated with the semaphore condition in response to the real time processor core reaching an end of the time critical code section.

Examples may also include cores including means for performing any of the aforementioned method examples.

Techniques described herein may therefore provide for a multi-core processor architecture that supports real time execution in the presence of general purpose execution without any need for loosening or violating hard deadlines. Moreover, concerns over multiple cores competing for shared resources may be obviated. Accordingly, it may be possible to engineer multi-core processors to run both an RTOS and a GPOS with tight execution deadlines on the RT side of the partition.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
a shared resource;
a suspendable processor core coupled to the shared resource, the suspendable processor core including,
a first suspend module to conduct a suspension of execution with respect to the suspendable processor core in response to a signal,
a memory monitor to detect a write to a semaphore memory location of the suspendable processor core, and
a first resume module to conduct a resumption of execution with respect to the suspendable processor core in response to the write; and
a real time processor core coupled to the shared resource, the real time processor core including,
a code monitor to detect a time critical code section associated with the real time processor core,
a second suspend module to issue the signal to the suspendable processor core in response to the time critical code section, and
a second resume module to conduct the write to the memory location associated with the semaphore condition in response to the real time processor core reaching an end of the time critical code section.

2. The system of claim 1, wherein the signal is to include an inter-processor interrupt (IPI).

3. The system of claim 2, wherein one or more non-IPIs of the system are disabled.

4. The system of claim 1, wherein the shared resource includes one or more of a last level cache, an input output (JO) controller and a memory controller.

5. The system of claim 1, wherein the first suspend module is to block a general purpose operating system from using the suspendable processor core during the suspension of execution.

6. The system of claim 1, wherein the code monitor is to detect the time critical code section in a real time operating system associated with the real time processor core.

7. The system of claim 1, wherein the suspension of execution places the suspendable processor core in one or more of a sleep state and a halt state.

8. A method comprising:
    detecting a time critical code section associated with a real time processor core;
    initiating a suspension of execution with respect to a suspendable processor core in response to the time critical code section;
    initiating a resumption of execution with respect to the suspendable processor core in response to the real time processor core reaching an end of the time critical code section, wherein the real time processor core shares a resource with the suspendable processor core;
    conducting the suspension of execution with respect to the suspendable processor core in response to a signal from the real time processor core;
    detecting a write by the real time processor core to a semaphore memory location of the suspendable processor core; and
    conducting the resumption of execution with respect to the suspendable processor core in response to the write by the real time processor core to the memory location.

9. The method of claim 7, wherein initiating the suspension of execution includes issuing an inter-processor interrupt (IPI) from the real time processor core to the suspendable processor core.

10. The method of claim 9, further including determining that one or more non-IPIs of a system having the suspendable processor core have been disabled.

11. The method of claim 7, wherein initiating the resumption of execution includes writing to a semaphore memory location of the suspendable processor core.

12. The method of claim 7, wherein the time critical code section is detected in a real time operating system.

13. The method of claim 8, wherein the signal from the real time processor core includes an inter-processor interrupt (IPI).

14. The method of claim 8, wherein conducting the suspension of execution includes blocking a general purpose operating system from using the suspendable processor core during the suspension of execution.

15. The method of claim 8, wherein the real time processor core and the suspendable processor core share one or more of a last level cache, an input output (IO) controller and a memory controller.

16. The method of claim 8, wherein initiating the suspension of execution comprises placing the suspendable processor core in one or more of a sleep state and a halt state.

17. At least one non-transitory computer-readable medium comprising one or more instructions that when executed on a real time processor core configure the real time processor core to:
    detect a time critical code section associated with the real time processor core;
    initiate a suspension of execution with respect to a suspendable processor core in response to the time critical code section;
    initiate a resumption of execution with respect to the suspendable processor core in response to the real time processor core reaching an end of the time critical code section, wherein the real time processor core is to share a resource with the suspendable processor core; and
    write to a semaphore memory location of the suspendable processor core to initiate the resumption of execution.

18. The medium of claim 17, wherein the instructions, when executed, configure the real time processor core to issue an inter-processor interrupt (IPI) to the suspendable processor core to initiate the suspension of execution.

19. The medium of claim 18, wherein the instructions, when executed, configure the real time processor core to determine that one or more non-IPIs of a system having the suspendable processor core have been disabled.

20. The medium of claim 17, wherein the instructions, when executed, configure the real time processor core to detect the time critical code section in a real time operating system associated with the real time processor core.

21. The medium of claim 17, wherein the real time processor core and the suspendable processor core are to share one or more of a last level cache, an input output (IO) controller and a memory controller.

22. The medium of claim 17, wherein the instructions, when executed, configure the real time processor core to initiate a suspension of execution with respect to a suspendable processor core by placing the suspendable processor core in one or more of a sleep state and a halt state.

23. At least one non-transitory computer-readable medium comprising one or more instructions that when executed on a suspendable processor core configure the suspendable processor core to:
    conduct a suspension of execution with respect to the suspendable processor core in response to a signal from a real time processor core, the signal being responsive to the real time processor core detecting a time critical code section associated with the real time processor core;
    detect a write by the real time processor core to a semaphore memory location of the suspendable processor core, the write being responsive to the real time processor core reaching an end of the time critical code section; and
    conduct a resumption of execution with respect to the suspendable processor core in response to the write by the real time processor core to the memory location, wherein the suspendable processor core is to share a resource with the real time processor core.

24. The medium of claim 23, wherein the signal from the real time processor core is to include an inter-processor interrupt (IPI).

25. The medium of claim 24, wherein the instructions, when executed, configure the suspendable processor core to determine that one or more non-IPIs of a system having the suspendable processor core have been disabled.

26. The medium of claim 23, wherein the instructions, when executed, configure the suspendable processor core to block a general purpose operating system from using the suspendable processor core during the suspension of execution.

27. The medium of claim 23, wherein the real time processor core and the suspendable processor core are to share one or more of a last level cache, an input output (IO) controller and a memory controller.

28. The medium of claim 23, wherein the instructions, when executed, configure the suspendable processor core to conduct a suspension of execution by placing the suspendable processor core in one or more of a sleep state and a halt state.

* * * * *